3,354,220
OXIDATION OF CARBONYL COMPOUNDS
Willem Brackman and Hendrik C. Volger, Amsterdam, Netherlands, assignors to Shell Oil Company, New York, N.Y., a corporation of Delaware
No Drawing. Filed Apr. 30, 1965, Ser. No. 452,389
Claims priority, application Netherlands, Sept. 8, 1964, 64—10,417
13 Claims. (Cl. 260—586)

This invention relates to the oxidation of unsaturated carbonyl compounds which have an ethylenic double bond in alpha,beta- or beta,gamma position with respect to the carbonyl carbon atom. It deals with a new method for oxidizing a special class of compounds of this type to introduce an atom of oxygen into the molecule and form products of increased value.

The invention is especially concerned with the oxidation of carbonyl compounds which have directly attached to the carbonyl carbon an alpha,beta- or beta,gamma-ethylenically unsaturated alkyl group of at least three carbon atoms containing at least one hydrogen-atom in the gamma- or alpha-position, respectively. The starting compounds are thus those which contain the structures $$-\overset{|}{\underset{H}{C}}-\overset{|}{C}=\overset{|}{C}-\overset{O}{\overset{\|}{C}}- \quad \text{or} \quad -\overset{|}{C}=\overset{|}{C}-\overset{|}{\underset{H}{C}}-\overset{O}{\overset{\|}{C}}-$$

In order to simplify the description these two types of carbonyl compounds will be referred to as the gamma-hydrogen compounds and the alpha-hydrogen compounds respectively, it being understood that the hydrogen atoms thus referred to are those shown in the foregoing structures. The new process is particularly advantageous for oxidation of aldehydes and ketones of this kind and the use of these will be emphasized in the following description of the invention.

It has now been found that oxidation of alpha-hydrogen and gamma-hydrogen carbonyl compounds as above defined can be carried out more advantageously by reacting these compounds in an alkaline liquid medium with oxygen-containing gas in the presence of a copper compound soluble in the reaction medium.

It has been previously proposed to oxidize unsaturated ethylenic carbonyl compounds with oxygen-containing gas in the presence of oxidation catalysts of various kinds. In U.S. Patent 2,443,818, for example, the oxidation of mesityl oxide with oxygen at 70° to 120° C. is described. Catalytic metals such as manganese, nickel, copper, cobalt and vanadium which may be in the form of their organic salts are suggested for the reaction in which an acid medium is used. The chief product is indicated to be alpha-methyl-beta-acetylacrylic acid in undisclosed yield together with small amounts of a few unidentified compounds having at least six carbon atoms in the molecule and a carbon-to-oxygen ratio of less than 6.

As a result of the use of an alkaline reaction medium with a soluble copper compound as the catalyst the process of the invention provides excellent yields of valuable oxidation products from the alpha-hydrogen and gamma-hydrogen carbonyl compounds previously indicated and permits the use of considerably lower temperatures than those recommended in the foregoing patent. Different types of products can be obtained by the new process. That produced in a given case will depend upon the structure of the starting carbonyl compound. Three types of initial products can be formed for example when using a gamma-hydrogen aldehyde or ketone $$R_1-\overset{R_2}{\underset{H}{\overset{|}{C}}}-\overset{|}{\underset{R}{C}}=\overset{|}{\underset{R}{C}}-\overset{O}{\overset{\|}{C}}-R_3$$

The initial product will be a dialdehyde or ketoaldehyde $$O=\overset{H}{\underset{}{\overset{|}{C}}}-\overset{|}{\underset{R}{C}}=\overset{|}{\underset{R}{C}}-\overset{O}{\overset{\|}{C}}-R_3$$

when $R_1$ and $R_2$ are both hydrogen atoms, and the other R's are hydrogen or hydrocarbon radicals. In other words the product will be a dialdehyde $$O=\overset{H}{\underset{}{\overset{|}{C}}}-\overset{|}{\underset{R}{C}}=\overset{|}{\underset{R}{C}}-\overset{O}{\overset{\|}{C}}-H$$

when $R_3$ is hydrogen, or a ketoaldehyde $$O=\overset{H}{\underset{}{\overset{|}{C}}}-\overset{|}{\underset{R}{C}}=\overset{|}{\underset{R}{C}}-\overset{O}{\overset{\|}{C}}-R_3$$

when $R_3$ is hydrocarbon. When $R_1$ is hydrocarbon and $R_2$ is hydrogen the initial products are diketones $$R_1-\overset{O}{\overset{\|}{C}}-\overset{|}{\underset{R}{C}}=\overset{|}{\underset{R}{C}}-\overset{O}{\overset{\|}{C}}-R_3$$

when $R_3$ is hydrocarbon or ketoaldehydes $$R_1-\overset{O}{\overset{\|}{C}}-\overset{|}{\underset{R}{C}}=\overset{|}{\underset{R}{C}}-\overset{O}{\overset{\|}{C}}-H$$

when $R_3$ is hydrogen. Tertiary hydroxy aldehydes and ketones $$R_1-\overset{R_2}{\underset{OH}{\overset{|}{C}}}-\overset{|}{\underset{R}{C}}=\overset{|}{\underset{R}{C}}-\overset{O}{\overset{\|}{C}}-R_3$$

are obtained when $R_3$ is hydrogen and hydrocarbon respectively and $R_1$ and $R_2$ are both hydrocarbon. The carbon atoms shown in these formulae can be a part of a cyclic structure in which case two of the R's (whether or not marked with a subscript) will together represent a divalent hydrocarbon radical.

The mechanism of the oxidation is not an essential feature of the invention which is not restricted to any theory as to the way the reaction takes place. However, a useful explanation of the results obtained can be based on the assumption that a dienolate anion $$-\overset{}{\underset{}{C}}=\overset{}{\underset{}{C}}-\overset{\overset{\ominus}{O}}{\underset{}{C}}=\overset{}{\underset{}{C}}-$$

is first formed in the reaction, the same ion being obtained when starting with either an alpha-hydrogen or gamma-hydrogen aldehyde or ketone. This explains why the same initial products are formed from both of these types of starting carbonyl compounds. The dienolate ion can further react with oxygen and the oxidation products so formed will contain a single oxygen atom attached to the carbon atom in gamma position relative to the carbonyl group whether the starting carbonyl compound is of the alpha-hydrogen or gamma-hydrogen type.

The formation of the dienolate ion proceeds most smoothly when alpha,beta-ethylenic carbonyl compounds with a gamma-hydrogen atom are used as starting material. When beta,gamma-ethylenic alpha-hydrogen carbonylic starting material is employed it can be converted in a separate step or in situ into the alpha,beta-ethylenic, gamma hydrogen isomer before carrying out the oxidation according to the invention. Treatment with an alcoholic solution of an alkali alcoholate is one suitable method for carrying out the double-bond isomerization. For example one can use sodium or potassium tert-butylate dissolved in the corresponding alcohol, followed by rapid neutralization by quenching with an equivalent amount of acid. The isomerization can also be effected in an other way, for instance with the aid of high-energy radiation.

In some cases the initially formed oxidation products described above may react further in situ to produce one or more secondary products. Dimerization, addition reactions and/or intramolecular ring closure are among the transformations which have been observed. As a result one can, for example, obtain unsaturated lactones from the 1,4-ketoaldehydes, polyacetals from the 1,4-dialdehydes, and ether-substituted products from Michael addition of a solvent alcohol molecule to the double bond of an initial product.

Among the copper compounds used as catalyst, the organic and inorganic copper salts are especially recommended. Preferably, copper carboxylates are used, such as cupric and cuprous formates, acetates, propionates, etc. Examples of suitable inorganic copper salts are nitrates, sulphates and halides, in particular the chlorides of copper. Organic copper complexes also give great satisfaction in the process of the invention. The copper compounds can be utilized to advantage in amounts of from 0.001 to 0.1 mole per mole of unsaturated carbonyl compound, but larger or smaller amounts are not excluded.

Since most copper compounds are relatively poorly soluble in alkaline reaction media, it is preferred to incorporate in the reaction mixtures of the invention also one or more compounds that increase the solubility of the copper compounds employed. These include soluble chelating agents for copper or other compounds that are capable of forming complexes with copper. In this respect nitrogen compounds which form soluble complexes with copper salts have been found to be especially advantageous. These include, for instance, pyridine, 2,2'-bipyridyl, biquinolines, phenanthroline, etc. Among these, pyridine is preferred. As a rule, the nitrogen compounds are used in amounts of from 0.05 to 50 mole per mole of copper compound. If desired, larger amounts of them may also be employed, for instance, if no further solvents are present in the reaction mixture.

Alcohols are recommended as one suitable type of solvents and/or diluents. Ethyl, isopropyl and the butyl alcohols are examples of alcohols which can be used individually or as mixtures of different alcohols or as mixtures of one or more alcohols with other liquids such as benzene and toluene. As a rule methanol is the preferred solvent. In some cases water may also be present in the reaction mixture without any objection, for instance, in combination with phenanthroline.

The reaction mixtures of the invention must be alkaline and preferably have a pH of at least about 7.5. More preferably a higher pH is used. To this end it is desirable to incorporate one or more strong bases in the mixture. Relatively small amounts of these basic compounds suffice, for instance molar amounts of from 0.01 to 50 mole per atom of dissolved copper.

Hydroxides of the alkali metals and alkaline earth metals are recommended as bases, in particular the hydroxides of sodium, potassium and magnesium. Other very suitable bases are alkaline alcoholates, such as sodium or potassium methylate, or ethylate, or the like. Quaternary ammonium bases and alkylamines, such as diethylamine, trimethylamine and triethylamine, etc., are also useful basis in the new process. The best results have been obtained with triethylamine in methanol.

As stated before, the oxidation according to the invention proceeds even at low temperatures. The reaction temperature is usually between −60 and +60° C. and preferably between −5 and +25° C.

The oxygen can be brought into contact with the other reactants in any suitable method, for instance, by stirring oxygen or an oxygen-containing gas into the reaction mixture, or by counter-current contact of oxygen-containing gas with the liquid reaction mixture in a packed tower. Other conventional methods of carrying out the reaction can also be used and the process can be conducted batchwise, intermittently or continuously.

The reaction pressure is usually between 0.5 and 1.5 atmospheres. If oxygen-containing gases are used, such as air or oxygen-enriched air, the partial oxygen pressures are preferably between 0.1 and 2 atmospheres. If desired, however, higher oxygen pressures may also be employed.

As previously indicated the initially formed products can be recovered as such or can be further reacted and recovered as desirable secondary reaction products. Production of products as called for in the accompanying claims is therefore not dependent upon the form in which they are recovered. Conventional methods of extraction with suitable solvents, distillation, and the like are suitable for separation of the final products from the other components which may be present in the reacted mixture.

The following examples illustrate in more detail some of the advantageous ways in which the new process can be applied.

EXAMPLE I

A reactor of 500 ml. capacity contained a homogeneous solution of 4 mmole cupric acetate, 63 mmole pyridine and 36 mmole triethylamine in 60 ml. methanol. The solution was covered by an oxygen atmosphere.

The reactor was provided with a vibromixer and a dropping funnel which was connected to a gas burette with which the amount of oxygen supplied could be determined. The dropping funnel contained a solution of 124 mmole crotonaldehyde in 20 ml. methanol. This solution was gradually added to the solution in the reactor, care being taken to maintain the temperature of the reaction mixture at 17° C.

The uptake of oxygen into the reaction mixture proceeded at the rate of 5 ml. per minute; a total of 2450 ml. oxygen was taken up.

Next, the reaction mixture was poured out into 400 ml. water of 0° C. mixed with 36 mmole HCl. HCl was added until the solution was acid to methyl red.

Then the solution was continuously extracted with 600 ml. diethyl ether for 24 hours. The ether extract was dried with anhydrous sodium sulphate. After filtration the solvent was evaporated off.

The residue consisted of a viscous reddish-brown oil from which two fractions were obtained by distillation under reduced pressure, having boiling ranges of 63–65° C. at 75 mm. Hg and 80–85° C. at 19 mm. Hg, respectively.

The latter fraction (8.3 grams) consisted of methoxy succinaldehyde. This results from addition of methanol to the initially formed maleic dialdehyde. The yield of dialdehyde was therefore 70% m., calculated on the amount of oxygen taken up.

The other fraction contained 1.4 grams of beta-methoxybutyraldehyde.

Substitution of alpha-phenyl crotonaldehyde for the crotonaldehyde in the above process results in the initial production of the alpha-phenyl-maleic dialdehyde from which methoxyphenylsuccinaldehyde is formed by further reaction with the methanol solvent.

EXAMPLE II

By using 1-cyclopentene-1-carboxyaldehyde under the conditions of Example I the initial product is 3-oxo-1-cyclopentene-1-carboxaldehyde from which the methoxy derivative can be obtained by addition of methanol at the double bond.

EXAMPLE III

A reactor of the type described in Example I contained a solution of 4 mmole cupric acetate, 5 ml. (63 mmole)

pyridine and 5 ml. (36 mmole) triethylamine in 80 ml. methanol. With vigorous stirring 10 ml. dypnone

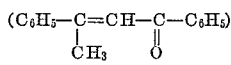

was rapidly added at 16° C. from the dropping funnel to the solution. After four hours the formation of a fine amorphous precipitate was observed. After 24 hours the reaction was discontinued; by then 1300 ml. oxygen had been taken up into the mixture.

The solid formed (1.7 grams) was filtered off, whereupon 300 ml. water and 30 ml. 4 N sulphuric acid were added to the filtrate. The yellow solution thus obtained was extracted four times with diethyl ether, each time with 100 ml. From the ether a further 3.2 grams of solid separated.

Consequently, a total of 4.9 grams of solids was isolated. With the aid of infra-red spectrography and a determination of the molecular weight, the material was identified as the gamma,gamma'-bislactone of alpha, gamma-diphenyl-gamma-hydroxycrotonic acid produced from initially formed ethylenic keto-aldehyde. The amount of bislactone obtained corresponds to a yield of 42% m., calculated on dypnone.

EXAMPLE IV

A solution of 0.5 mmole $\Delta^5$-cholestene-3-one in 20 ml. methanol was added at 12.5° C. with vigorous stirring to a solution of 0.2 mmole cupric acetate, 2.0 ml. pyridine and 0.5 ml. triethylamine in 7.5 ml. methanol. The equipment used for this purpose was of the type described in Example I, except that the vibromixer had been replaced by a magnetic stirrer.

Oxygen was rapidly taken up (2.2 ml. per minute); the total amount taken up was 12.0 ml. (0.5 mmole).

After cooling to 0° C., 2 N hydrochloric acid was continuously added to the mixture, until the color of the latter changed from dark blue to very pale blue. During the addition of hydrochloric acid a precipitate was formed which was isolated by filtration. The solid thus obtained was identified as $\Delta^4$-cholestene-3,6-dione. The yield was 75% m., calculated on $\Delta^5$-cholestenone.

When progesteron is substituted for the $\Delta^5$-cholestene-3-one in the foregoing reaction a good yield of $\Delta^5$-progestene-3,6-dione is obtained.

EXAMPLE V

A reactor contained a solution of 1.6 mmole cupric nitrate, 3.0 mmole o-phenanthroline and 1.0 ml. triethylamine in 10 ml. methanol under an oxygen atmosphere. The reactor was provided with a magnetic stirrer, a dropping funnel, a connection to a vacuum line and an oxygen supply line, in which line a gas burette had been inserted.

The dropping funnel contained a solution of 2.7 grams of 5-methyl-4-hexene-2-one in 15 ml. methanol. This solution was gradually added at 20° C. with stirring to the solution in the reactor over a period of 30 minutes.

The uptake of oxygen proceeded initially at the rate of 5 ml. per minute. After three hours a total of 615 ml. oxygen had been taken up.

The organic compounds were driven out of the reaction mixture through the vacuum line by evaporation at a pressure of 0.1–0.05 mm. Hg and caused to condense at −80° C. in a cool trap.

From the liquid obtained the volatile components were removed by distillation. With the aid of gas-liquid chromatography it was demonstrated that acetaldehyde, methyl acetate, beta,beta-dimethylglycidaldehyde and methyl-beta,beta-dimethylglycidate, among others, had been formed in molar yields of 25%, 12%, 10% and 35%, respectively, calculated on 5-methyl-4-hexene-2-one.

From the residue 5-methyl-5-hydroxy-3-hexene-2-one was isolated in a yield of 50% m., calculated on 5-methyl-4-hexene-2-one.

EXAMPLE VI

In the manner described in Example V the same reaction was carried out using ethanol as solvent instead of methanol. From the liquid obtained by condensation at −80° C. the volatile components were removed by distillation. The presence of ethyl acetate, ethyl-beta,beta-dimethyl glycidate and beta,beta-dimethylglycidaldehyde in the distillate was demonstrated with the aid of gas-liquid chromatography. The yields of these compounds were 15, 40 and 12% m., respectively.

The residue contained 5-methyl-5-hydroxy-3-hexene-2-one in a yield of 40% m., calculated on 5-methyl-4-hexene-2-one.

As previously indicated, the foregoing examples are merely illustrative of some of the ways in which the new process can be carried out, the invention being broadly applicable to the oxidation of any alpha,beta- or beta, gamma-ethylenic aldehyde or ketone which has at least one hydrogen atom attached to a saturated carbon atom in gamma or alpha position respectively to the carbonyl carbon and directly linked to one of the carbon atoms of said ethylenic group. Specific ethylenic aldehydes and ketones, other than those used in the foregoing examples, well adapted for oxidation by the method of the invention include the following arranged according to the type of compound which they form as initial product in the reaction. Alpha,beta-ethylenic aldehydes which give ethylenic dialdehydes as initial products are for instance, tiglic aldehyde and alpha,beta-dimethylacrolein. Representative alpha,beta-ethylenic aldehydes which give ketoaldehydes as initial products are 2-pentenal, beta, beta - diethylacrolein, tetrahydrobenzaldehyde, gamma-benzylcrotonaldehyde, etc. Alpha,beta-ethylenic aldehydes which give tertiary hydroxy ethylenic aldehydes are 4-methyl-2-pentenal, 3-methyl-1-cyclohexene-1-carboxaldehyde, beta-isopropyl acrolein, 4-phenyl-2-pentenal, and the like. Alpha,beta-ethylenic ketones which give ketoaldehydes as initial products are, for example, propenyl methyl ketone, 4-hexen-3-one, 2,5-dimethyl-2-cyclopentenone, d-verbenone, and propenyl phenyl ketone. Those giving diketones as initial products include trans-3-hepten-2-one; cyclohexen-3-one; 5-ethyl-4-hepten-3-one; 1,3-diphenyl-2-pentene-1-one, etc. Alpha,beta-ethylenic ketones giving hydroxy ketones as initial products are isobutylidene acetone, 7-methyl-5-octen-4-one; 2,2,3-trimethyl-4-cyclopentenone; 1-phenyl-4-methyl-2-penten-1-one, and the like.

Beta,gamma-ethylenic aldehydes giving dialdehydes as initial products include 3-butenal; 3-tertbutyl-3-butenal, 2-phenyl-3-butenal, 2-methylene hexahydrobenzaldehyde, etc. Those giving ketoaldehydes initially include 3-hexenal, 2-ethyl-3-hexenal, 1-cyclopentenyl-acetaldehyde and 3-phenyl-3-pentenyl-acetaldehyde and 3-phenyl-3-pentenal. Examples of beta,gamma-ethylenic aldehydes whose initial oxidation products are tertiary hydroxy ethylenic aldehydes include 4-methyl-3-pentenal, 3-methyl - $\Delta^2$ - tetrahydrobenzaldehyde, 4,4 - diphenyl-3-butenal, etc. Beta,gamma-ethylenic ketones which give ketoaldehydes as initial products are, for instance, isomesityl oxide; 4,5-dimethyl-5-hexen-3-one; 1-phenyl-3-methyl-3-buten-1-one, and the like. Those which give diketones as initial products include 4-hexen-2-one; $\Delta^5$-cholestene-3-one; 1-cyclopentenylacetone, 1-phenyl-3-penten-1-one, etc. Beta,gamma-ethylenic ketones giving hydroxyketones include 5 - methyl-4-hepten-2-one; 1-acetyl-3-methyl-2-cyclohexene; 3-methyl-2-butenyl phenyl ketone, and the like.

One can also use in the reaction aldehydes and ketones which contain a plurality of carbonyl groups and/or a plurality of ethylenic double bonds. Examples of starting materials of these kinds are glutaronaldehyde, 3-hepten-1,6-dione, geranial, beta-allyl acrolein, $\Delta^{1,4}$-dihydrobenzaldehyde; 2,5-heptadiene-4-one and irone.

Certain of the carbonyl compounds useful in the invention have more than one carbon atom at which oxidation can take place in the new process. Thus for example a trialdehyde can be formed from tiglic aldehyde because of the presence in the starting compound of two methyl groups in gamma position. Further oxidation can also take place in certain instances under the influence of a carbonyl group introduced into the initial product. This is illustrated in the oxidation of alpha,beta-dimethyl-acrolein according to the following equations which show formation of the same trialdehyde as from tiglic aldehyde.

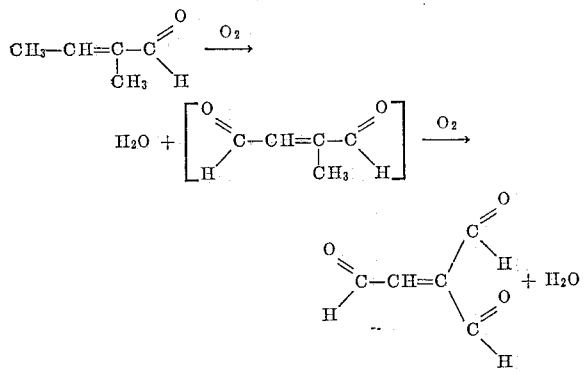

By similar further oxidation of the isopropyl maleic dialdehyde initial product from alpha-isopropyl crotonaldehyde the hydroxy ethylenic dialdehyde

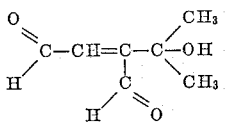

would be formed. This hydroxy dialdehyde can also be formed when starting with beta-methyl-beta-isopropyl-acrolein. Further oxidation such as this can be controlled by regulating the proportions of oxygen used in the process, lower proportions favoring addition of only a single atom of oxygen per molecule. It is generally preferable to use such lower proportions with carbonyl compounds of the foregoing special types which are subject to further oxidation. In other cases the proportion of oxygen contacted with the carbonyl compound is not important since the oxidation will stop after an equimolar amount of oxygen has been consumed.

In general the best results have been obtained with alpha,beta- and beta-gamma-ethylenic carbonyl compounds having 4 to about 30 carbon atoms per molecule in the case of the aldehydes and 5 to about 30 carbon atoms per molecule in the case of the ketones. Especially useful starting materials are those composed only of carbon, hydrogen and carbonyl oxygen atoms and having ethylenic double bonds as the only multiple linkages between aliphatic carbon atoms. The new process is of particular value for the oxidation of starting monoethylenic, monoaldehydes and monoketones. While unsubstituted aldehydes and ketones have been emphasized in the foregoing it will be apparent that one can also use starting carbonyl compounds which contain substituents such as hydroxyl, carboxyl, and ether groups and chlorine atoms which are not reactive under the reaction conditions and do not interfere with the desired oxidation. Still other variations can be made in the process of the invention which is not limited to the modifications given by way of illustration nor is the invention to be restricted by any theory or mechanism of reaction proposed in explanation of the good results which are obtained.

We claim as our invention:

1. A process for the oxidation of a monocarbonylic monoethylenic compound of 4 to 30 carbon atoms per molecule composed only of carbon, hydrogen and carbonyl oxygen atoms and having the ethylenic double bond as the only multiple linkage between aliphatic carbon atoms, said double bond being attached to a carbon atom once removed from the carbonyl carbon atom and there being a hydrogen atom linked to a saturated noncorbanyl carbon atom directly linked to at least one of the carbon atoms to which the double bond is attached, which comprises reacting said compound in an alcoholic alkaline liquid medium having a pH of at least 7.5 with oxygen-containing gas in the presence of from 0.001 to 0.1 mole per mole of said monocarbonylic compound of a copper salt soluble in the said medium, at a temperature from −60° C. to +60° C.

2. A process for the oxidation of an alpha,beta-ethylenic carbonyl compound of 4 to 30 carbon atoms per molecule composed only of atoms of carbon, hydrogen and carbonyl oxygen and having a hydrogen atom linked to a saturated carbon atom directly attached to the beta-carbon atom of said ethylenic group, ethylenic double bonds being the only multiple linkages between aliphatic carbon atoms in the molecule, which comprises reacting said compound in an alcoholic alkaline liquid medium having a pH of at least 7.5 with oxygen-containing gas in the presence of from 0.001 mole to 0.1 mole per mole of said carbonyl compound of a copper salt, soluble in the said medium, at a temperature from −60° C. to +60° C.

3. A process for the oxidation of a beta-gamma-ethylenic carbonyl compound of 4 to 30 carbon atoms per molecule composed only of atoms of carbon, hydrogen and carbonyl oxygen and having a hydrogen atom linked to the saturated alpha-carbon atom which links the beta, gamma-ethylenic group to the carbonyl carbon atom, ethylenic double bonds being the only multiple linkages between aliphatic carbon atoms in the molecule, which comprises reacting said compound in an alcoholic alkaline liquid medium having a pH of at least 7.5 with oxygen-containing gas in the presence of from 0.001 mole to 0.1 mole per mole of said carbonyl compound of a copper salt soluble in the said medium, at a temperature from −60° C. to +60° C.

4. A process for producing an oxidation of a monoethylenic monocarbonyl compound of 4 to 30 carbon atoms per molecule having the formula

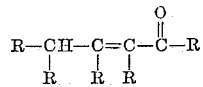

wherein the R's are members of the group consisting of hydrogen and hydrocarbon and the ethylenic double bond is the only multiple linkage between aliphatic carbon atoms in the molecule, which comprises reacting said compound in an alcoholic alkaline liquid medium having a pH of at least 7.5 with oxygen-containing gas in the presence of from 0.001 mole to 0.1 mole per mole of said monocarbonyl compound of a copper carboxylate soluble in the said medium, at a temperature from −60° C. to +60° C.

5. A process for producing a dialdehyde which comprises oxidizing an ethylenic monoaldehyde of 4 to 30 carbon atoms per molecule having the formula

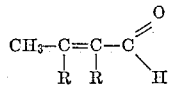

wherein the R's are chosen from the group consisting of hydrogen and hydrocarbon having 1 to 26 carbon atoms and the ethylenic double bond shown is the only multiple linkage between aliphatic carbon atoms in the molecule, which comprises reacting a solution of said monoaldehyde in an alcoholic alkaline liquid medium having a pH of at least 7.5 with oxygen-containing gas in the presence of from 0.001 mole to 0.1 mole per mole of said monoaldehyde of a copper carboxylate soluble in the said medium, at a temperature from −60° C. to +60° C.

6. A process for producing a ketoaldehyde which comprises oxidizing a monoethylenic monoketone having 5 to 30 carbon atoms per molecule and the formula

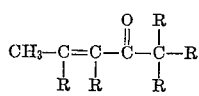

wherein the R's are chosen from the group consisting of hydrogen and hydrocarbon having 1 to 25 carbon atoms and the ethylenic double bond shown is the only multiple linkage between aliphatic carbon atoms in the molecule, which comprises reacting a solution of said monoketone in an alcoholic alkaline liquid medium having a pH of at least 7.5 with oxygen-containing gas in the presence of from 0.001 mole to 0.1 mole per mole of said monoketone of a copper carboxylate soluble in the said medium, at a temperature from $-60°$ C. to $+60°$ C.

7. A process for producing a diketone which comprises oxidizing a monoethylenic monoketone of 5 to 30 carbon atoms per molecule having the formula

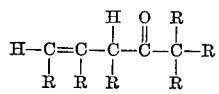

wherein the R's are chosen from the group consisting of hydrogen and hydrocarbon having 1 to 25 carbon atoms and the ethylenic double bond shown is the only multiple linkage between aliphatic carbon atoms in the molecule, by reacting a solution of said monoketone in an alcoholic alkaline liquid medium having a pH of at least 7.5 with oxygen-containing gas in the presence of from 0.001 to 0.1 mole per mole of said monoketone of a copper carboxylate soluble in the said medium, at a temperature from $-60°$ C. to $+60°$ C.

8. A process for producing a tertiary hydroxy monoethylenic monoketone which comprises oxidizing a monoethylenic monoketone of 5 to 30 carbon atoms per molecule having the formula

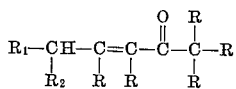

wherein each R is a member of the group consisting of hydrogen and hydrocarbon having 1 to 23 carbon atoms, $R_1$ and $R_3$ represent hydrocarbon of 1 to 25 carbon atoms and the ethylenic double bond shown is the only multiple linkage between aliphatic carbon atoms in the molecule, by reacting a solution of said ketone in an alcoholic alkaline liquid medium having a pH of at least 7.5 with oxygen-containing gas in the presence of from 0.001 mole to 0.1 mole per mole of said monoketone of a copper carboxylate soluble in the said medium, at a temperature from $-60°$ C. to $+60°$ C.

9. A process in accordance with claim 1 wherein copper carboxylate is used as the copper compound.

10. A process in accordance with claim 1 in which the copper compound is complexed with an amine.

11. A process in accordance with claim 1 wherein a lower aliphatic tertiary amine is used to make the reaction medium alkaline.

12. A process in accordance with claim 1 wherein a lower aliphatic saturated alcohol is used as a solvent for the unsaturated carbonyl compound being oxidized.

13. A process for the oxidation of a monoethylenic monocarbonyl compound of 4 to 30 carbon atoms per molecule having the formula

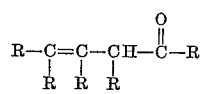

wherein the R's are members of the group consisting of hydrogen and hydrocarbon and the ethylenic double bond is the only multiple linkage between aliphatic carbon atoms in the molecule, which comprises reacting said compound in an alcoholic alkaline liquid reaction medium having a pH of at least 7.5 with oxygen-containing gas in the presence of from 0.001 mole to 0.1 mole per mole of said monocarbonyl compound of a copper carboxylate soluble in the said medium, at a temperature from $-60°$ C. to $+60°$ C.

References Cited
UNITED STATES PATENTS 2,648,638   8/1953   Richter.
2,688,041   8/1954   Middleton _____ 260—586
2,883,426   4/1959   Brackman _____ 260—596

LEON ZITVER, *Primary Examiner.*

BERNARD HELFIN, *Examiner.*

M. JACOB, *Assistant Examiner.*